US008547661B2

(12) United States Patent
Bai

(10) Patent No.: US 8,547,661 B2
(45) Date of Patent: Oct. 1, 2013

(54) MAMR HEAD WITH SELF-ALIGNED WRITE ELEMENT AND MICROWAVE FIELD GENERATOR

(75) Inventor: Zhigang Bai, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 805 days.

(21) Appl. No.: 12/589,274

(22) Filed: Oct. 21, 2009

(65) Prior Publication Data
US 2011/0090603 A1    Apr. 21, 2011

(51) Int. Cl.
G11B 5/127    (2006.01)
G11B 5/23    (2006.01)
G11B 5/187    (2006.01)

(52) U.S. Cl.
USPC .................. 360/125.3; 360/128; 360/122

(58) Field of Classification Search
USPC ..................... 360/128, 125.3, 122
See application file for complete search history.

(56) References Cited

U.S. PATENT DOCUMENTS

| | | | |
|---|---|---|---|
| 8,259,411 B2 * | 9/2012 | Yang et al. | 360/125.13 |
| 2008/0019040 A1 | 1/2008 | Zhu et al. | |
| 2009/0059423 A1 | 3/2009 | Yamada et al. | |
| 2009/0080120 A1 * | 3/2009 | Funayama et al. | 360/319 |
| 2009/0316304 A1 * | 12/2009 | Funayama et al. | 360/234.3 |
| 2010/0007996 A1 * | 1/2010 | Iwasaki et al. | 360/324 |
| 2010/0309577 A1 * | 12/2010 | Gao et al. | 360/75 |
| 2011/0216447 A1 * | 9/2011 | Li et al. | 360/313 |
| 2012/0134048 A1 * | 5/2012 | Takeo et al. | 360/110 |

* cited by examiner

*Primary Examiner* — Will J Klimowicz
(74) *Attorney, Agent, or Firm* — Saile Ackerman LLC; Stephen B. Ackerman

(57) ABSTRACT

The invention discloses a MAMR head that has the STO stack placed at the trailing side of the write element, with both STO and write element completely self-aligned in the cross track direction. A method for defining both the MP and the STO stack geometries in a single step is also described.

9 Claims, 6 Drawing Sheets

MAMR HEAD WITH SELF-ALIGNED WRITE ELEMENT AND MICROWAVE FIELD GENERATOR

FIELD OF THE INVENTION

The invention relates to the general field of perpendicular magnetic recording with particular emphasis on the use of a locally generated microwave field to effectively lower the coercivity of a storage bit while it is being (intentionally) written.

BACKGROUND OF THE INVENTION

Microwave assisted magnetic recording, MAMR, is one of several future technologies that are expected to extend perpendicular magnetic recording beyond 1 terabit per square inch. In this scheme, a field generator is placed in close proximity to the write element to produce a high frequency oscillating field in the media film plane. The frequency range of the oscillating field could be from 5 GHz to 50 GHz. Because of ferromagnetic resonance (FMR), it becomes possible to switch media grains at fields below their normal coercivity i.e. a lower write field may be used, but only in the immediate vicinity of the microwave assisted write element.

The microwave field generator typically is made of a spin torque oscillator (STO), which resembles a current-perpendicular-to-plane (CPP) GMR or TMR structure in that the current flows perpendicular to the film, although the magnetization directions in the stack are different from those of a CPP GMR/TMR sensor. US patent application US2008/0019040A1 (Zhu et al.) provides details of the STO stack structure.

As shown schematically in FIG. 1, the simplest configuration for STO 11 is a tri-layer stack consisting of spin injection layer SIL 12, interlayer IL 13 (non-magnetic metal or insulating barrier), and field generating layer FGL 14. The SIL magnetization is kept perpendicular to the film, either by an external magnetic field or through its intrinsic magnetic anisotropy. When electrons transit the SIL their spins become polarized by the magnetization present in the SIL. The resulting spin polarization is carried into the FGL by electrons that have crossed interlayer 13. Spin torque oscillation then occurs in the FGL, producing the oscillating field.

In order to utilize STO for MAMR recording, the STO needs to be placed as close as possible to where the writing occurs i.e. on the trailing side of the write pole. It is also very important for the oscillating field from the STO to be perfectly aligned with the write field from the main pole (MP) in the cross track direction so as to retain maximum track density.

A routine search of the prior art was performed with the following references of interest being found:

U.S. Patent Application 2009/0059423 (Yamada et al) shows a spin torque oscillator between a main pole and trailing shield, but no details are given as to how it is fabricated.

SUMMARY OF THE INVENTION

It has been an object of at least one embodiment of the present invention to provide a MAMR head that is not subject to accidental erasure of adjoining tracks Another object of at least one embodiment of the present invention has been for the STO and the MP to always be in perfect alignment.

Still another object of at least one embodiment of the present invention has been to provide optional side shields and a leading shield for said MAMR head.

A further object of at least one embodiment of the present invention has been to provide a method for self-aligning said MAMR head and said MP during their formation.

These objects have been achieved through the provision of a method that allows the STO and the MP to be self-aligned. First, layers of materials from which the STO and the MP can be formed are laid over one another, covering the entire work surface. Then a single mask is provided that defines the top surface of each STO/MP unit. Ion beam etching is then used (in combination with this mask) to remove extraneous material all the way down to the substrate, thereby forming the units.

During etching the angle of the ion beam can be varied according to the designer's choice. For example, the ion beam may be maintained at a single angle throughout which results in a unit having inwardly sloping sidewalls that all lie in a single plane. Alternatively, the ion beam could be set to initially etch in a vertical direction and then directed away from the vertical after some preset amount of material has been removed.

Six different embodiments of the invention are disclosed including two ways of making contact between the STO and the trailing shield, using a non-magnetic trailing 'shield' as a way to reduce sideways flux leakage from the MP, and the provision of side and leading shields.

BRIEF DESCRIPTION OF THE DRAWINGS

FIGS. 4a'-4g'. Process flow for manufacturing the embodiment 1 structure (cross-section)

FIGS. 5a'-5d'. Process flow for manufacturing the embodiment 2 structure (cross-section).

DESCRIPTION OF THE PREFERRED EMBODIMENTS

Figure 1:
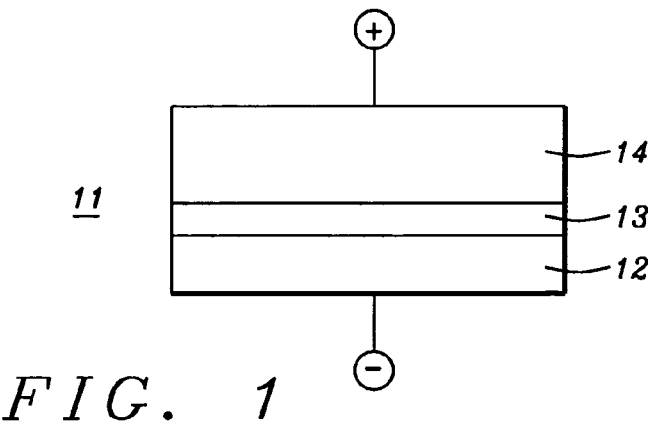
FIG. 1. Schematic of the STO stack, showing the SIL, the IL, and the FGL. Additional protective layers, such as Ru, on either side of the stack are not shown.
Figure 2A:
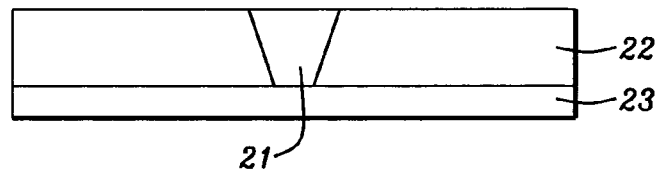
FIGS. 2a-2e. Process flow for our present method of forming a MAMR head.
Figure 2B:
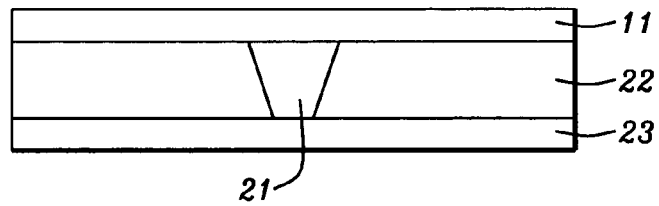

FIGS. 2a to 2e show how we currently form the write element and STO combination. Note that, although this process and the resulting structure have been previously employed by the inventor, they are not considered to be prior art that is known outside Headway Technology:

FIG. 2a shows an air bearing surface (ABS) view of main pole 21 on substrate 23 embedded in filler insulation 22 (typically though not necessarily $Al_2O_3$). STO stack 11 is then deposited over the full upper surface of both 21 and 22, as shown in FIG. 2b. This is followed by the formation of etch mask 24 directly over, and as closely aligned as possible with, main pole 21. See FIG. 2c. Mask 24 may be either of photoresist or it could be a hard mask of a material such as $Al_2O_3$ or SiN.

Figure 2C:
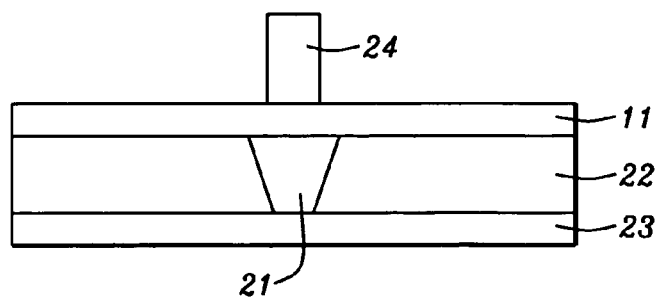
Figure 2D:
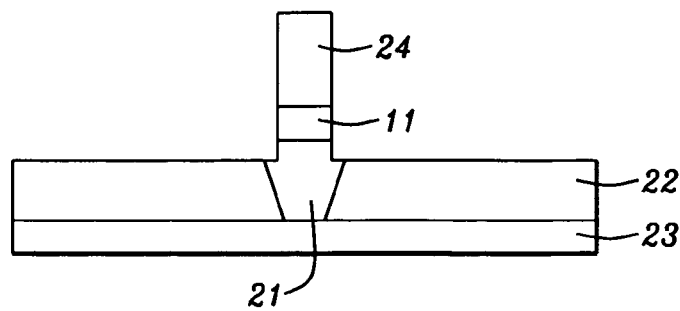
Figure 2E:
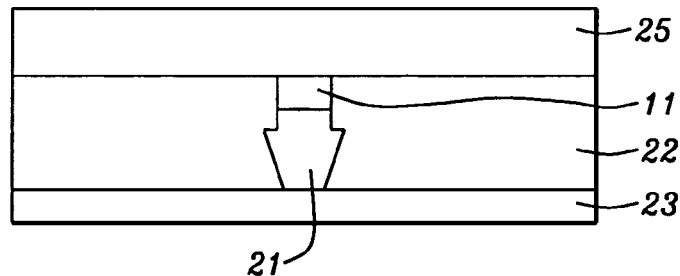

All unprotected parts of STO stack 11 as well as about 100-200 Angstroms of main pole 21 and filler insulation 22 are then removed by either ion beam or reactive ion etching, giving the structure the appearance shown in FIG. 2d. This is followed (as shown in FIG. 2e) with the removal of all residual photoresist or hard mask material. The latter may be selectively removed through reactive ion etching (RIE), using the appropriate chemicals. The process concludes with the replacement of any lost filler insulation, and the formation of trailing shield 25 (generally through electrodeposition).

There are several difficulties associated with this process. First, after the main write pole has been formed, precisely aligning the write pole and STO in the cross track direction is very difficult since a separate photolithography process has been used to define the track width of the STO (FIGS. 2c and 2d). Secondly, after the chemical mechanical planarization (CMP) of the MP (which results in the structure of FIG. 2a), there is usually some non-planarity right in the MP area closest to the final ABS location. This is due to CMP polish rate differences between the MP and the surrounding materials. This could affect the quality of the STO stack and thus degrade the performance of the oscillating field that is generated.

We now disclose several embodiments of the present invention, each of which overcomes the problems that we have described immediately above:

Embodiment 1

Figure 3A:
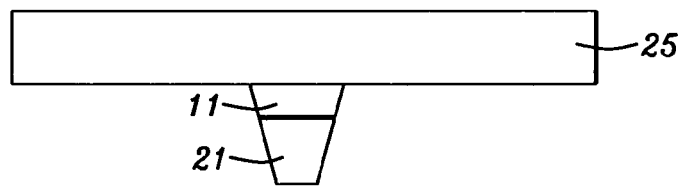
FIGS. 3a-3d. These illustrate embodiments 1, 2, 3, and 4, respectively.

Referring now to FIG. 3a, the MAMR head includes main pole 21, trailing shield (TS) 25, and STO stack 11 (which is sandwiched between MP 21 and TS 25). The MP and the TS also serve as electrodes for the STO stack to ensure CPP current flow through STO. The MP has a beveled sidewall giving it either a trapezoidal or a triangular pole shape for reduced side writing at skew. In the ABS view shown, the STO stack sitting at the MP trailing edge is self-aligned to the shape and position of the MP, so that the sidewalls of both the STO and the MP are coplanar. For illustration purposes only, the STO stack has been shown in a bottom-to-top (SIL/interlayer/FGL) configuration, but a FGL/interlayer/SIL configuration could equally well have been used. Various additional layers such as a bottom gap, a capping layer, or any of several possible insertion layers inside the stack are not shown in the figure.

Embodiment 2

Figure 3B:
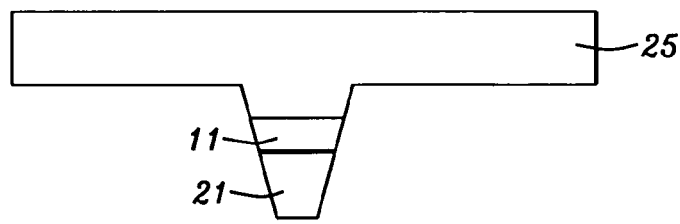

As seen in FIG. 3b, this embodiment is the same as FIG. 3a except that trailing shield 25 includes a lower protrusion that is part of the self-aligned structure, whereby the sidewalls of the protrusion, the STO, and the MP are all coplanar.

Embodiment 3

Figure 3C:
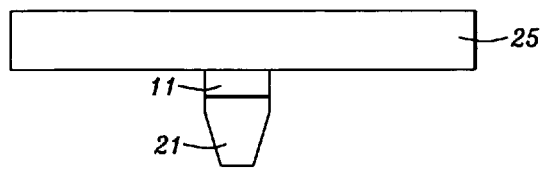

Referring now to FIG. 3c, this is the same as FIG. 3a except that a top portion of MP 21 has a substantially vertical sidewall that continues upward through STO 11 all the way to the underside of TS 25.

Embodiment 4

Figure 3D:
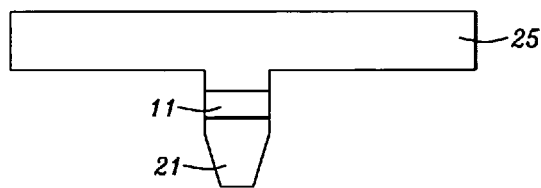

Referring now to FIG. 3d, this is the same as FIG. 3a except that MP 21 has a substantially vertical sidewall that continues upward through STO 11 as well as through a downward protruding portion on the underside of TS 25, said protrusion extending for a distance (e.g., 20 nm) below the MP trailing edge.

Embodiment 5

The geometry for this embodiment can be the same as that of any of the preceding four embodiments, but the trailing 'shield' is formed from a non-magnetic metal for the sole purpose of serving as an electrode. As a consequence, the write pole becomes a mono-pole head, whose write field perpendicular to the media is stronger than that of the preceding four embodiments since it has no significant MP-to-TS field perpendicular to the STO stack. For this embodiment, magnetization of the STO in a direction perpendicular to the stack has to be maintained by some other mechanism such as crystalline magnetic anisotropy.

Embodiment 6

This embodiment can have the form of any of embodiments 1-5, except that it also has side shields (separated from the MP by a non-magnetic gap) and, optionally, a leading shield.

Method of Making the Structures:

We will now describe process flows for manufacturing embodiments 1 (FIG. 3a) and 2 (FIG. 3b). Each step is shown in two views: 4x (or 5x) which are ABS views and 4x' (or 5x') which are cross-sections made through the center of main pole 21. The broken vertical line that is present in all the cross-sectional views represents the future ABS plane.

Figure 4A:
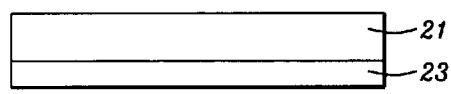
FIGS. 4a-4g. Process flow for manufacturing the embodiment 1 structure (ABS view).
Figure 4A:
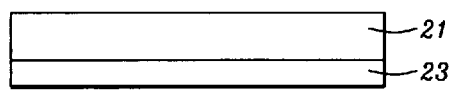
Figure 4B:
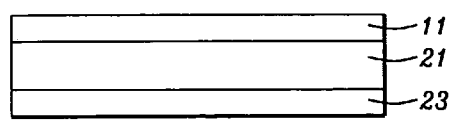
Figure 4B:
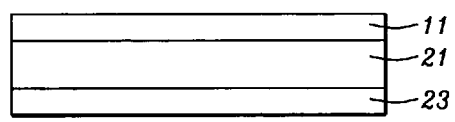
Figure 4C:
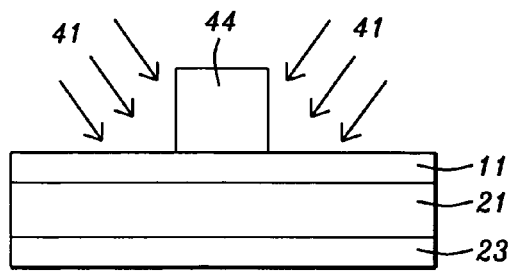
Figure 4C:
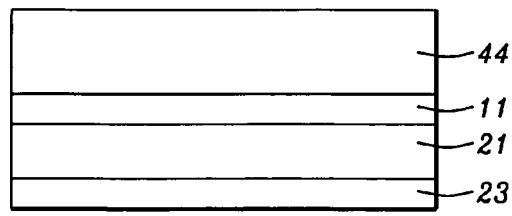

The first four steps are common to both processes. These are illustrated in FIGS. 4a-4d:

The process begins, as shown in FIGS. 4a and 4a', with the deposition onto substrate 23 of material suitable for the formation of main pole 21. This is followed by the deposition of unpatterned STO stack 11 as shown in FIGS. 4b and 4b'. Next, as seen in FIGS. 4c and 4c', mask 44 (photoresist or hard) is formed on STO stack 11 and then subjected to IBE at an angle away from vertical of between 15 and 75 degrees, with 30 degrees (±10 degrees) being preferred, so as to form pedestal 43 which, as shown, has inwardly sloping sidewalls.

Figure 4D:
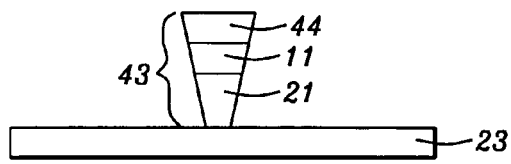
Figure 4D:
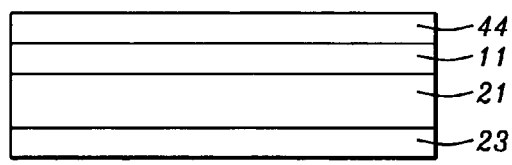
Figure 4E:
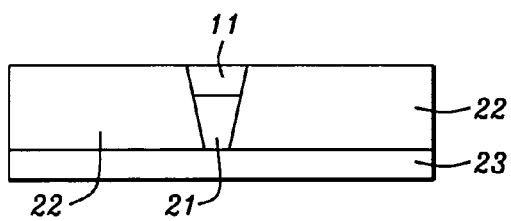
Figure 4E:
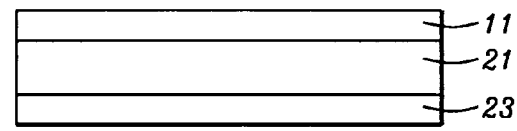

The first of the final three steps for forming embodiment 1 is illustrated in FIGS. 4e and 4e'. First, mask 44 is stripped away. The structure is then embedded in fresh filler insulation 22, following which it is planarized, giving it the appearance shown in FIG. 4e. Note that layer 22 is present only outside MP 21 and STO 11 so does not appear in FIG. 4e'.

Figure 4F:
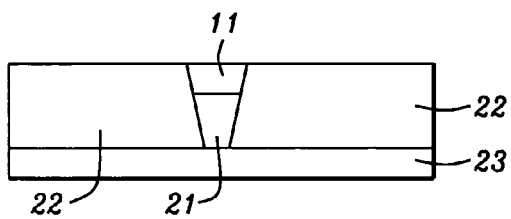
Figure 4F:
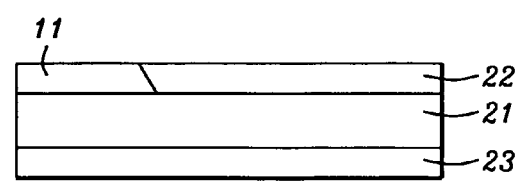
Figure 4G:
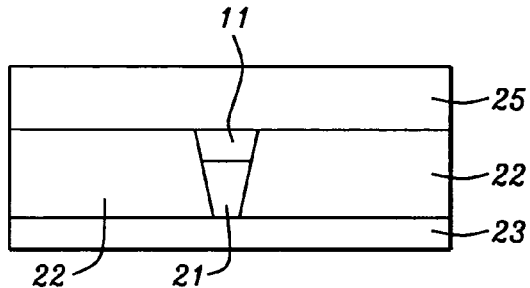
Figure 4G:
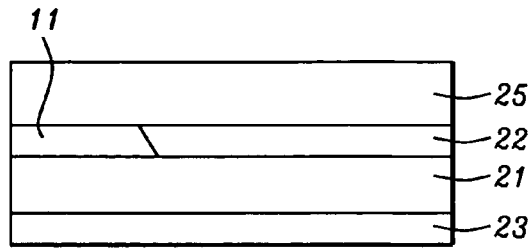

In the next step, as shown in FIG. 4f', starting between 0.03 and 0.2 microns back from the plane of the future ABS, STO layer 11 is removed and replaced with additional filler insulation 22. The process concludes with the deposition of trailing shield 25 whose lower surface is single plane that contacts STO 11 with no downward protrusion at its point of contact therewith.

FIG. 5 shows the process flow for making the embodiment 2 structure (FIG. 3b). As already noted, FIGS. 5a and 5a' proceed from FIGS. 4d and 4d' respectively. The principal difference between FIG. 4e and FIG. 5a is that the remaining portion of mask 44 is left in place when additional filler 22 is deposited and subsequently planarized. Only then is the residue of mask 44 stripped away, giving the structure the appearance illustrated in FIGS. 5b and 5b'.

Figure 5A:
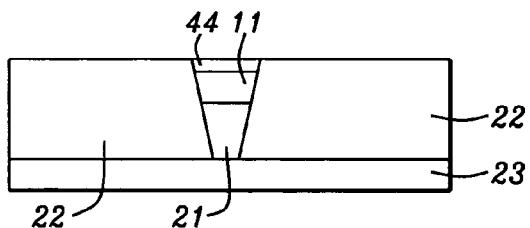
FIGS. 5a-5d. Process flow for manufacturing the embodiment 2 structure (ABS view).
Figure 5A:
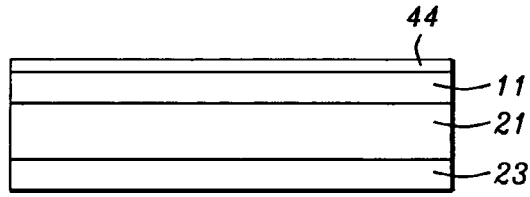
Figure 5B:
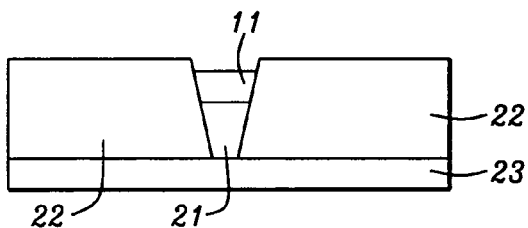
Figure 5B:
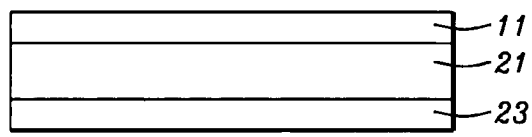
Figure 5C:
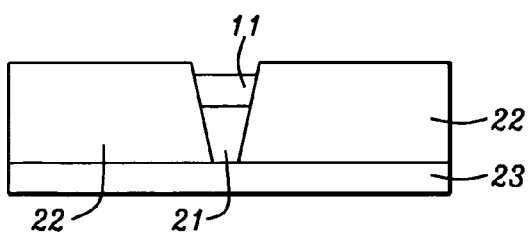
Figure 5C:
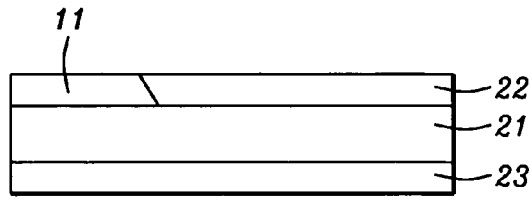

Then, as shown in FIG. 5c', starting between 0.03 and 0.2 microns back from the plane of the future ABS, STO layer 11 is removed and replaced with additional filler insulation 22. Thus, as seen in FIG. 5c, the top surface of STO 11 is lower than the top surface of filler insulation layer 22.

Figure 5D:
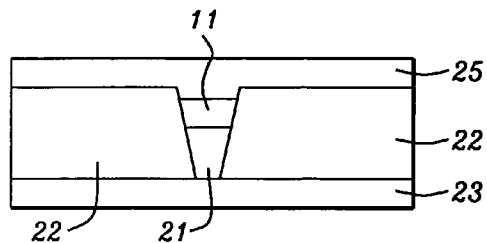
Figure 5D:
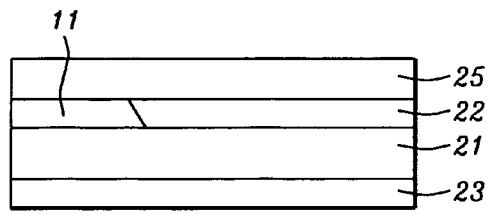
Figure 6A:
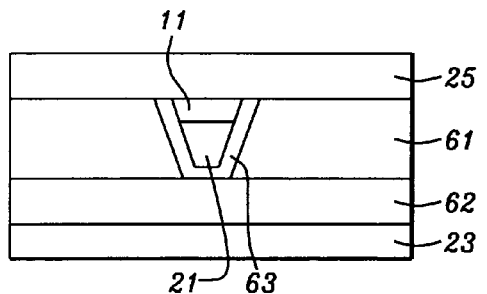
FIGS. 6a-6d illustrate how the above embodiments can be modified to include side shields and/or a leading shield.
Figure 6B:
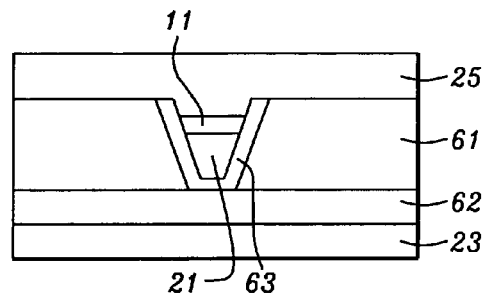
Figure 6C:
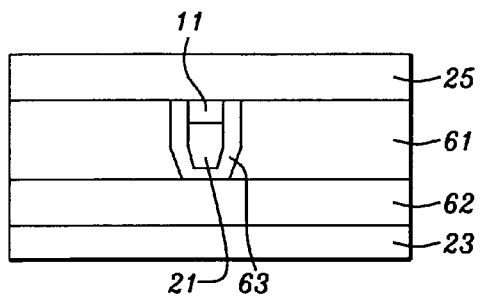
Figure 6D:
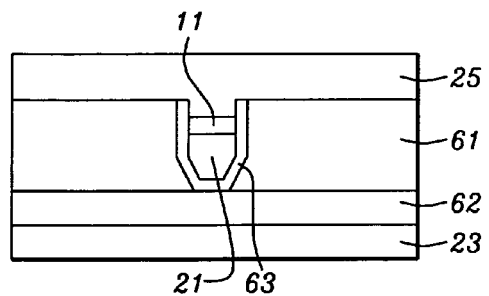

The process concludes, as shown in FIGS. 5d and 5d', with the deposition of trailing shield 25 whose lower surface protrudes downwards in the area where it overlies STO 11 in order to make contact therewith.

A detailed description of the processes for forming embodiments 3 and 4 will not be presented since these are similar to the steps used to form embodiments 1 and 2 respectively, the main difference being the details of how step 3 (shaping pedestal 43 as shown in FIGS. 4c and 4d) is executed. For example, the profiles generated for FIGS. 3a and 3b would be achieved by maintaining a fixed angle for the ion beam throughout its etching time, but, to generate structures 3c and 3d, a vertical beam is used initially and then changed to an angled beam when etching of the main pole starts.

Embodiment 6 it can be made by replacing step 5 (FIGS. 4e and 5a) with the formation of non-magnetic side gap 63 and then electroforming side shields 61 instead of using filler insulation as before. The leading shied can be deposited on non-magnetic substrate 23 at the beginning of step 1 (FIG. 4a).

SUMMARY

The STO is formed in a one step process that ensures a self-aligned structure that is perfectly aligned with respect to the trailing edge of the MP, including, if opted for, a downward protrusion therefrom.

Since they are in perfect alignment, substituting a MAMR head for a conventional one does not lead to any loss of cross-track resolution.

The STO is formed on a flat surface thereby improving stack quality and device performance.

What is claimed is:

1. A self-aligned microwave assisted magnetic recording (MAMR) head having an air bearing surface (ABS), comprising:
    a substrate on which is a main pole (MP) having first inwardly sloping sidewalls;
    on, and in contact with, said MP, a spin torque oscillator (STO) having second inwardly sloping sidewalls;
    said STO extending away from said ABS for a distance;
    said STO and said MP being in perfect alignment with one another, their respective sidewalls abutting one another in a linearly continuous manner, whereby both said MP and said STO do not have an exposed surface that is neither a sidewall nor part of the ABS;
    over said MP, a trailing shield (TS) having a lower surface, part of which contacts said STO; and
    filler material located between said substrate and said TS on both sides of said MP and STO.

2. The self-aligned MAMR head described in claim 1 wherein said TS lower surface is a single plane.

3. The self-aligned MAMR head described in claim 1 wherein said TS contacts said STO through a protrusion that extends downwards from said TS lower surface for a distance of between 50 and 500 Angstroms.

4. The self-aligned MAMR head described in claim 1 wherein said STO has vertical sidewalls and said MP has sidewalls that are vertical for a distance of between 50 and 500 Angstroms below said STO and, from there on down, sidewalls that slope inwards at an angle between 4 and 20 degrees from vertical.

5. The self-aligned MAMR head described in claim 1 wherein said trailing shield has been formed from electrically conductive non-magnetic material, whereby said trailing shield serves as an electrode and said MP is a mono-pole head that has no significant field normal to said STO, thereby improving writability.

6. The self-aligned MAMR head described in claim 1 wherein said filler material is magnetic whereby said MAMR head has side shields.

7. The self-aligned MAMR head described in claim 6 further comprising a layer of magnetic material between said MP and said substrate that serves as a leading shield.

8. The self-aligned MAMR head described in claim 1 wherein said STO is optimized for microwave generation in a range of from 5 to 50 GHz.

9. The self-aligned MAMR head described in claim 1 wherein said distance that said STO extends away from said ABS is in a range of from 0.03 to 0.2 microns.

* * * * *